United States Patent
Corr et al.

(10) Patent No.: US 6,676,838 B2
(45) Date of Patent: Jan. 13, 2004

(54) APPARATUS AND METHODS FOR REMOVING SOLVENT RESIDUES

(75) Inventors: Stuart Corr, Warrington (GB); Paul A. Dowdle, St. Helens (GB); Robert E. Low, Northwich (GB); Frederick Thomas Murphy, Frodsham (GB); James David Morrison, Sandiway (GB)

(73) Assignee: Ineos Fluor Holdings Limited, Runcorn (GB)

( * ) Notice: Subject to any disclaimer, the term of this patent is extended or adjusted under 35 U.S.C. 154(b) by 0 days.

(21) Appl. No.: 10/083,977

(22) Filed: Feb. 27, 2002

(65) Prior Publication Data

US 2002/0195329 A1 Dec. 26, 2002

Related U.S. Application Data

(63) Continuation of application No. PCT/GB00/03345, filed on Sep. 1, 2000.

(30) Foreign Application Priority Data

Sep. 6, 1999 (GB) .............................................. 9920943

(51) Int. Cl.$^7$ ............................................... B01D 11/04
(52) U.S. Cl. ...................... 210/634; 210/143; 210/175; 210/511; 210/634; 210/739; 210/774; 210/805; 426/425; 554/8
(58) Field of Search .......................... 210/85, 143, 175, 210/180, 194, 259, 511, 634, 639, 739, 774, 805, 87; 554/8, 9, 12, 13, 15, 16, 20, 21; 426/424, 425, 592, 600; 422/260

(56) References Cited

U.S. PATENT DOCUMENTS

| 4,278,012 A | | 7/1981 | Wheldon et al. ............ 426/600 |
| 5,344,564 A | | 9/1994 | Ohtsuka et al. .............. 210/634 |
| 5,516,923 A | | 5/1996 | Hebert et al. .................. 554/12 |
| 5,620,728 A | * | 4/1997 | Langley et al. ................. 554/8 |
| 5,707,673 A | * | 1/1998 | Prevost et al. ................ 554/12 |
| 5,998,640 A | * | 12/1999 | Haefele et al. ................ 554/12 |

FOREIGN PATENT DOCUMENTS

| DE | 35 38 745 A1 | 5/1987 |
| EP | 0 061 877 A2 | 10/1982 |
| GB | 1 476 697 | 6/1977 |
| GB | 2 059 787 A | 4/1981 |
| GB | 2 288 552 A | 10/1995 |
| WO | WO 00/33859 | 6/2000 |

* cited by examiner

Primary Examiner—Joseph Drodge
(74) Attorney, Agent, or Firm—Cook, Alex, McFarron, Manzo, Cummings & Mehler, Ltd.

(57) ABSTRACT

An apparatus (10') for extracting biomass includes an extractor (11), evaporator (12), compressor (13) and condenser (14) connected in series by pipework (17) to define a closed loop extraction circuit. A transfer line (18) selectively supplies hot solvent vapor from the outlet side of the compressor (13) to the interior of the extractor (11), where the solvent vapor heats the biomass. This causes stripping of solvent from the biomass. The transfer line (18) includes control elements (19,20) for controlling the flow of solvent vapor.

18 Claims, 1 Drawing Sheet

APPARATUS AND METHODS FOR REMOVING SOLVENT RESIDUES

CROSS REFERENCE TO RELATED APPLICATION

Figure 1:
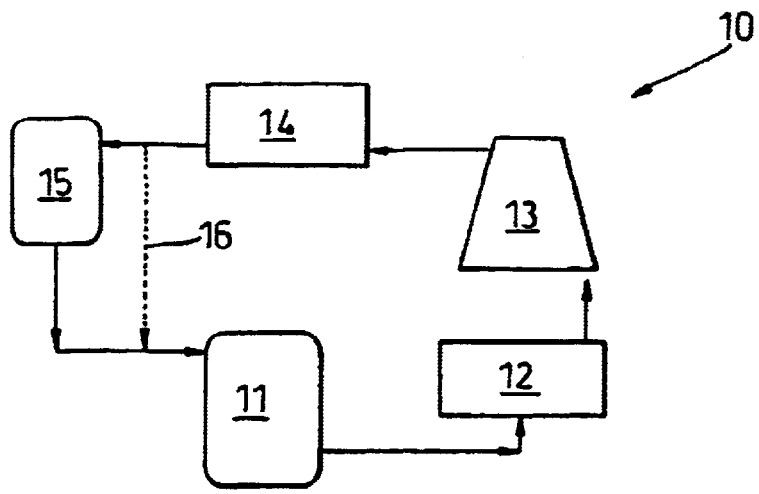

This application is a continuation of pending International Application No. PCT/GB00/03345, filed Sep. 1, 2000 and published in English.

This invention concerns an apparatus and methods for removing solvent residues in particular after "extraction" of biomass. Biomass extraction is the extraction of flavours, fragrances or pharmaceutically active ingredients from materials of natural origin (these materials being referred to as "biomass").

BACKGROUND OF THE INVENTION

Examples of biomass materials include but are not limited to flavoursome or aromatic substances such as coriander, cloves, star anise, coffee, orange juice, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable e.g. from plant material, a cell culture or a fermentation broth.

There is growing technical and commercial interest in using near-critical solvents in such extraction processes. Examples of such solvents include liquefied carbon dioxide or, of particular interest, a family of chlorine-free solvents based on organic hydrofluorocarbon ("HFC") species.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ hydrofluoroalkanes. Suitable examples of $C_{1-4}$ hydrofluoroalkanes which may be used as solvents include, inter alia, trifluoromethane (R-23), fluoromethane (R-41), difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), 1,1,1,2,3,3-hexafluoropropane (R-236ea), heptafluoropropanes and particularly 1,1,1,2,3,3,3-heptafluoropropane (R-227ea), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea) and 1,1,1,3,3-pentafluorobutane (R-365mfc). Mixtures of two or more hydrofluorocarbons may be used if desired.

R-134a, R-227ea, R-32, R-125, R-245ca and R-245fa are preferred.

An especially preferred hydrofluorocarbons for use in the present invention is 1,1,1,2-tetrafluoroethane (R-134a).

It is possible to carry out biomass extraction using other solvents such as chlorofluorocarbons ("CFC's") and hydrochlorofluorocarbons ("HCFC's"), and/or mixtures of solvents. CFC's and HCFC's are not approved for food use and consequently are rarely employed in extraction processes in which the depleted biomass residue is intended as e.g. an animal feed.

Known extraction processes using solvents are normally carried out in closed-loop extraction equipment. A typical example 10 of such a system is shown schematically in FIG. 1.

In this typical system, liquefied solvent is allowed to percolate by gravity in downflow through a bed of biomass held in vessel 11. Thence it flows to evaporator 12 where the volatile solvent is vaporised by heat exchange with a hot fluid. The vapour from evaporator 12 is then compressed by compressor 13. The compressed vapour is next fed to a condenser 14 where it is liquefied by heat exchange with a cold fluid. The liquefied solvent is then optionally collected in intermediate storage vessel 15 or returned (line 16) directly to the extraction vessel 11 to complete the circuit.

One of the key areas of concern relating to the use of solvents such as are used in biomass extraction processes is the level of residual solvent on the biomass material after extraction is complete. High levels of residual HFC (or other) solvent may be regarded as undesirable from a number of aspects:

loss of HFC to atmosphere;

loss of HFC from the recycle process potentially increasing top-up costs;

landfill, incineration, composting and other biomass disposal regulatory issues; and suitability of depleted biomass for use as an animal feed supplement.

When an extraction is completed it is customary to allow as much as possible of the solvent to drain from the extraction vessel 11 to the solvent evaporator, whether by gravity or by imposed pressure difference between the extractor 11 and evaporator 12. This does not however guarantee the complete removal of liquid solvent: some may be trapped in the voids of the extractor bed and some will be chemically adsorbed onto the surface of the biomass.

Any liquid solvent which is not removed from the biomass prior to the vessel being opened for cleaning will obviously be lost from the system. This is undesirable from a financial viewpoint. It also means that the solvent is emitted to the environment, either by direct vaporisation on opening, or by slow desorption and vaporisation from the biomass which is also undesirable. If the biomass is disposed of by incineration, and the solvent contains fluorine, this may attract an additional cost penalty for incineration because most commercial incineration plant can only handle fluorine-containing wastes by blending with other material.

In order to improve the rate of solvent extraction, the biomass is usually chopped or ground in some manner in order to increase the surface area in contact with the extraction solvent. Whilst beneficially increasing the rate of extraction of the desired components during biomass extraction, this increased surface area acts to increase the quantity of solvent that can remain adsorbed onto and in the biomass after extraction. Clearly some cost-effective method of achieving acceptable residual HFC solvent levels in the exhausted biomass would be of significant value in the development of the technology.

One way to remove residual solvent from a bed of biomass is to supply heat. This forces evaporation/desorption and therefore allows substantial removal of the residue. This can be accomplished conventionally by admission of heated air or steam, or by supply of external heat to the walls of the packed bed extractor vessel 11.

Methods involving heat supply are however not very efficient for the following reasons.

In the case that hot air is used to remove the solvent, the solvent is driven off as a low concentration of condensable vapour in an inert air vent. The recovery of solvent from such vents is a well known problem in the chemical process industry: owing to the boiling points of most volatile solvents the refrigeration equipment required to condense and recover solvent from such vents is rarely economically justified at small scale, yet most extraction equipment for the flavour and fragrance industry is at relatively small scale. Thus although the biomass is cleaned of solvent, this solvent is still lost to the user and still represents an emission to the environment.

When steam is used as a heat source, recovery of solvent is possible: in this case the steam would first be condensed, leaving a vent of mostly solvent, then a second refrigerated condenser could be used to condense the solvent vent. However this too is potentially costly in terms of additional equipment. Furthermore the condensed steam will be contaminated with solvent, the condensed solvent will be contaminated with water, and there will probably still be losses of solvent to the atmosphere.

If heat is supplied to the external wall of the extractor as the final stage of the extraction process, then some vaporisation of solvent can be expected. In this case any solvent vaporised will be recovered in the normal way and thus is not lost from the system. The problem with this approach is that the thermal conductivity of a packed bed of material (biomass and solvent) which is substantially free of liquid will be very low—approaching the thermal conductivity of the solvent vapour. This means that the rate at which heat can be transmitted radially into the vessel will be low and consequently the time taken to raise the whole bed temperature to a level which is effective for desorption will be large. This time represents a loss of potential processing time and is therefore an economic penalty.

A combination of evacuation and heat (e.g. using a heating jacket surrounding extraction vessel 11 and additional components to evacuate the vessel 11) may also act to reduce the levels of residual solvent in the biomass over a period of time. This method however has a number of potential disadvantages including:

prolonged evacuation time to achieve low residue levels; and
 poor heat transfer into the packed bed of biomass from the vessel jacket resulting in uneven heating and possible thermal deterioration of the biomass (charring, caramelisation etc.).

Such charring and caramelisation are particularly undesirable since they may adversely affect the commercial value of the biomass extracts.

BRIEF SUMMARY OF THE INVENTION

According to the invention in a first aspect there is provided apparatus for extracting biomass, comprising a closed loop circuit including, operatively connected in series, an extractor, for containing biomass, that permits a solvent or a solvent mixture to contact biomass to effect extraction; an evaporator for separating solvent and biomass extract from one another; a compressor for compressing gaseous solvent; and a condenser for condensing pressurized solvent for return to the extraction vessel, wherein the apparatus includes a fluid transfer line for supplying hot fluid from a part of the closed loop circuit, remote from the extractor, to solvent in the extractor; and one or more control elements for controlling the supply of hot fluid via the transfer line.

This apparatus advantageously permits the efficient supply of heat to the spent biomass and solvent in the extractor, thereby improving the efficiency of solvent recovery.

Preferably the transfer line supplies hot solvent vapour from the outlet of the compressor to the solvent in the extractor. Such vapour is, of course, under high pressure, so a means of reducing this pressure is desirable.

On passing through the biomass/solvent mixture in the extractor the hot gas gives up its heat thereby acting as a heat source for vaporisation/desorption of residual liquid. The vapour thus produced flows back to the compressor through the normal solvent pipework and so over time the trapped solvent can be removed and recovered via the main solvent condenser.

Practical features of the extractor of the apparatus of the invention are described and claimed in published International Application No. PCT/GB00/03345, filed Sep. 1, 2000, which is incorporated herein by reference and are further embodied in apparatus of the type described above wherein the extractor is an upright, hollow vessel and the transfer line supplies hot fluid to the base of the hollow vessel, and wherein the extractor contains a bed of biomass.

Preferably the control elements include one or more of a flow restrictor; and an isolation The flow restrictor advantageously ensures that despite the bleeding of solvent vapour from the outlet side of the compressor the pressure of fluid exiting the compressor remains sufficiently high to permit effective condensation in the condenser.

The isolation valve permits the transfer line to be selectively opened and closed. In preferred embodiments of the invention the transfer line is normally closed.

One preferred form of the flow restrictor is or includes an adjustable orifice plate connected in line in the transfer line whereby hot fluid passing to the solvent in the extractor passes through the orifice plate. An alternative flow restrictor is or includes a length of capillary tubing connected in line in the transfer line whereby hot fluid passing to the solvent in the extractor passes along the capillary tubing. Other forms of flow restrictor are possible and are within the scope of the invention.

The control elements referred to herein above may optionally be replaced or augmented by a modulating control valve. Such valves combine the functions of the flow restrictor and the isolation valve in a single device.

Conveniently the apparatus includes a controller for controlling the control element or elements. In preferred embodiments the controller is e.g. a programmable microprocessor such as a sequential batch controller.

In particularly preferred embodiments the controller controls the or a said control element to prevent flow of hot fluid to solvent in the extractor while the apparatus operates to extract biomass; and controls the or a said control element to permit flow of hot fluid via the transfer line after completion of a period of biomass extraction. This advantageously ensures that the hot fluid transfer does not commence until completion of a biomass extraction cycle.

More preferably the apparatus includes a detector for detecting completion of a period of biomass extraction, the detector being operatively connected to the controller for permitting said flow of hot fluid upon the detector detecting said completion. In particular, the detector described above includes a sensor for sensing the rate of condensation of solvent in the circuit, the controller permitting said flow of hot fluid when the rate of condensation is less than a predetermined rate. Such arrangements are advantageously simple, and provide an automatic indication of when biomass extraction is complete.

According to a second aspect of the invention there is provided a method of removing solvent from biomass in an extractor forming part of a biomass extraction circuit, the circuit including a working fluid circulating therein whereby the fluid in a part of the circuit remote from the extractor is hotter than solvent mingled with the biomass, the method including the step of transferring working fluid from the said part of the circuit via a transfer line to the extractor to heat solvent mingled with the biomass and separate the solvent and biomass from one another.

This method may advantageously be practised using apparatus according to the invention.

Advantageous features are embodied in the above-described method wherein the working fluid transferred via the transfer line is solvent vapor and/or including the step of controlling the flow of working fluid along the transfer line.

According to a third aspect of the invention there is provided a method of extracting biomass in an extractor forming part of a closed loop extraction circuit comprising, connected in series, the extractor, an evaporator, a compressor and a condenser, the method including the steps of circulating solvent around the circuit whereby the solvent passes through the extractor and extracts biomass; operating the evaporator to separate solvent and biomass extract from one another; compressing solvent in the compressor; and condensing solvent in the condenser, the method further including the step of transferring hot solvent vapour from a part of the circuit, remote from the extractor, to the extractor to heat biomass and solvent therein and thereby separate biomass and solvent in the extractor from one another.

Advantageous features are embodied in such method wherein the transfer of hot vapour occurs via a transfer line that is selectively openable and closeable to control the transfer of hot solvent vapour to the extractor, the method including the step of controlling the said transfer using the transfer line. A further advantageous feature of the above includes the steps of preventing transfer of hot vapour via the transfer line while the rate of condensation of solvent in the circuit exceeds a predetermined rate; and permitting transfer of hot vapour via the transfer line when the rate of condensation of solvent in the circuit falls below the predetermined rate, thereby signifying substantial completion of biomass extraction.

The methods described above may also conveniently be practised using the apparatus according to the invention.

The invention also resides in solvent recoverable directly by the methods defined herein; and in biomass extract obtainable directly by the methods defined herein.

There now follows a description of preferred embodiments of the invention, by way of non-limiting example, with reference being made to the accompanying drawings.

BRIEF DESCRIPTION OF THE SEVERAL VIEWS OF THE DRAWING(S)

Figure 2:
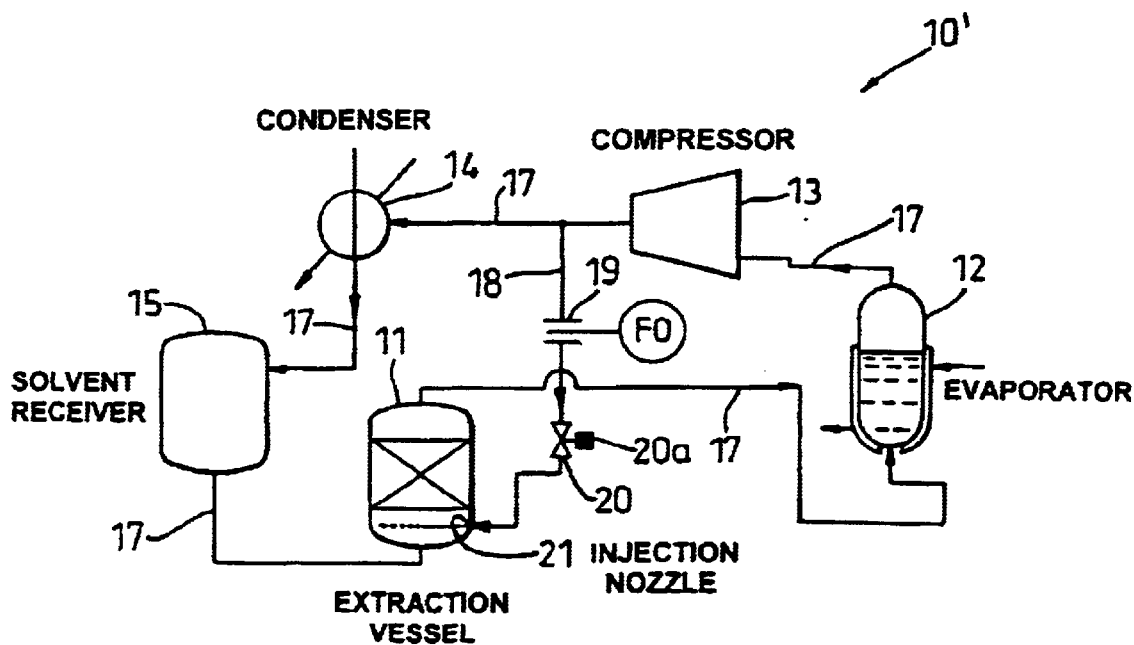

FIG. 1 is a schematic representation of a prior art closed loop biomass extraction circuit; and FIG. 2 is a schematic representation of apparatus according to the invention.

DETAILED DESCRIPTION OF THE INVENTION

Referring to FIG. 2 there is shown apparatus 10', for extracting biomass, according to the invention. Several of the components of apparatus 10' of FIG. 2 are of similar function and/or construction to corresponding components in the apparatus 10 of FIG. 1. Such corresponding components are denoted by the same reference numerals in FIG. 2 as in FIG. 1.

Apparatus 10' is a closed loop circuit including, operatively connected in series, an extractor 11, an evaporator 12, a compressor 13, a condenser 14 and an optional solvent receiver 15.

Apparatus 10' includes pipework 17 operatively interconnecting the various components to complete the closed loop. In some embodiments solvent receiver 15 may be dispensed with and a single length of the pipework 17 used directly to interconnect the condenser 14 and the extractor 11.

In the embodiment shown the extractor 11 is an upright, hollow substantially closed cylinder that may be packed with a bed of biomass to be extracted.

Preferably the bed of biomass is densely packed and completely occupies the interior cross-section of extractor 11 over a portion of its axial length.

Regardless of the precise nature of the biomass bed, the extractor permits a solvent such as but not limited to R-134a to contact biomass to effect extraction.

In FIG. 2 the solvent is supplied at the base of extractor 11 and flows upwardly through the biomass therein by virtue of suction of the compressor 13. However other arrangements, such as a gravity flow of solvent as shown in FIG. 1; or pumping or sucking solvent through the biomass in another direction or flow pattern, are possible.

The evaporator operates, by heating, to separate the solvent and any biomass extract entrained therewith from one another. The biomass extract in the extractor is drained for further commercial use.

The compressor and condenser respectively compress and condense the solvent from which biomass extract has been separated, whereby the solvent is available for re-use in the extractor 11, optionally after collecting in receiver 15.

Apparatus 10' includes a transfer line 18 interconnecting the outlet (high pressure) side of compressor 13, remote from extractor 11, and the interior of extractor 11. Transfer line 18 serves selectively to supply hot fluid in the form of hot, compressed solvent vapour, to the interior of extractor 11.

Transfer line 18 is for the most part a hollow pipe of similar construction to the pipework 17.

Transfer line 18 includes one or more control elements for controlling the flow of hot fluid. In the embodiment shown the control elements are in the form of a flow restrictor 19, described in more detail below; and an isolation valve 20, connected in series.

In FIG. 2 the flow restrictor is an adjustable orifice plate of per se known construction that may be adjusted, by replacement with differently sized plates between extraction cycles.

As an alternative to the adjustable flow restrictor 19, the flow restrictor may be non-adjusting, e.g. in the form of a length of capillary tubing (not shown in FIG. 2 but of per se known construction) connected in line in transfer line 18.

Other forms of flow restrictor are possible within the scope of the invention. The primary function of the flow restrictor is to permit transfer of hot solvent vapour to the extractor 11 while maintaining the vapour pressure in the pipework 17 interconnecting the compressor 13 and condenser 14.

Isolation valve 20 is adjustable e.g. by means of a rotary member 20a to open and close the transfer line 18.

The rotary member 20a may in some embodiments be operated manually if desired. Alternatively the actuators in the apparatus may be powered by motors acting under the control of a controller such as a programmable batch controller in the form of e.g. a microprocessor.

The flow restrictor 19 and isolation valve 20 may if desired be replaced or augmented by a modulating control valve (not shown in FIG. 2 but of per se known design) installed in line in transfer line 18.

A modulating control valve is known which combines the flow restrictor and isolator (ON-OFF) functions of the restrictor 19 and valve 20 of FIG. 2.

The modulating control valve may be manually operated or motor actuated, any actuating motors optionally operating under the control of a controller as described herein above.

When present the controller controls the or each controllable control element in transfer line 18 to prevent flow of hot solvent vapour to the extractor 11 while biomass extraction takes place. The controller permits such flow after completion of a period of biomass extraction.

The apparatus 10' may include a detector for detecting the completion of a said period, the detector optionally being in the form of a sensor, whose output is an input to the controller, for sensing the rate of condensation of solvent in the circuit (e.g. at the condenser 14). When the sensor detects that the rate of condensation has fallen to below a predetermined rate the controller then operates to permit the flow of hot solvent vapour to the extractor 11.

The apparatus includes a nozzle 21 connected to the end of transfer line 18, inside extractor 11 at the base thereof. Nozzle 21 allows even distribution of gas across the transverse cross-section of the biomass bed, thereby ensuring good separation of solvent from the biomass residue.

In use of the apparatus 10' the extractor 11 is packed with biomass as aforesaid, the pipework 17 is charged with solvent as necessary and the evaporator 12, compressor 13 and condenser 14 operated as necessary to achieve biomass extraction.

During this process the transfer line 18 is closed by means of the isolation valve 20 and/or the modulating control valve (if present). Biomass extract is drained as desired from evaporator 12.

At the end of the extraction process (determined e.g. by the detector, or on the basis of timings) the isolation valve 20 and/or the modulating control valve open and, optionally, the flow restrictor is adjusted to achieve a desired flow of hot solvent vapour, output from the compressor, through the biomass. Hot solvent vapour can then pass through the bed, heating the contents as it goes and thereby causing vaporisation of residual solvent. This delivers heat across the whole radial profile of the bed and therefore is superior to heating from the external wall only.

After the hot solvent vapour has passed through the biomass bed for a sufficient period substantially all of the solvent trapped therein is liberated and flows around the main flow loop 17, to the receiver 15 (if present) or back to the extractor 11 (if the receiver is absent). The isolating valve 20 and/or modulating control valve may then be closed as part of preparing the apparatus 10' for further use to extract biomass.

The precise nature of the control (whether it is manual or determined by an automatic controller as described) will depend on the biomass being extracted. It is necessary to develop appropriate operating procedures for each biomass as the amount of solvent held up will vary from biomass to biomass.

In summary, the of benefits of the invention include improved removal of solvent from biomass prior to emptying/cleaning/disposal of spent biomass; improved recovery of valuable solvent compared to e.g. air stripping or steam cleaning operations; reduced heating time compared to introduction of heat through external wall; and little additional equipment or complexity of control required compared to alternative means of effecting solvent removal and recovery.

What is claimed:

1. Apparatus for extracting biomass, comprising a closed loop circuit including, operatively connected in series,
    an extractor, for containing biomass, that permits circulating solvent to contact biomass to effect extraction;
    an evaporator for separating solvent and biomass extract from one another;
    a compressor for compressing gaseous solvent; and a condenser for condensing pressurised solvent for return to the extraction vessel, wherein the apparatus includes a fluid transfer line for supplying hot fluid from a part of the closed loop circuit, remote from the extractor, to the extractor separately from the circulating solvent; and
    one or more control elements for controlling the supply of hot fluid via the transfer line, and wherein said fluid transfer line interconnects the outlet of the compressor and the extractor.

2. Apparatus according to claim 1 wherein the extractor is an upright, hollow vessel and the transfer line supplies hot fluid to the base of the hollow vessel.

3. Apparatus according to claim 2 wherein the extractor contains a bed of biomass.

4. Apparatus according to claim 1 wherein the control elements include one or more of:
    a flow restrictor; and
    an isolation valve.

5. Apparatus according to claim 4 wherein the flow restrictor is or includes an adjustable orifice plate connected in line in the transfer line whereby hot fluid passing to the solvent in the extractor passes through the orifice plate.

6. Apparatus according to claim 4 wherein the flow restrictor is or includes a length of capillary tubing connected in line in the transfer line whereby hot fluid passing to the solvent in the extractor passes through the capillary tubing.

7. Apparatus according to claim 1 wherein the control elements are constituted by, or include, a modulating control valve.

8. Apparatus according to claim 1 including a controller for controlling said control element or elements.

9. Apparatus according to claim 8 wherein the controller controls the or a said control element to prevent flow of hot fluid via said transfer line to solvent in the extractor while the apparatus operates to extract biomass; and controls the or a said control element to permit flow of hot fluid via the transfer line after completion of a period of biomass extraction.

10. Apparatus according to claim 9 including a detector for detecting completion of a period of biomass extraction, the detector being operatively connected to the controller for permitting said flow of hot fluid via said transfer line upon the detector detecting said completion.

11. Apparatus according to claim 10 wherein the detector includes a sensor for sensing the rate of condensation of solvent in the circuit, the controller permitting said flow of hot fluid via said transfer line when the rate of condensation is less than a predetermined rate.

12. Apparatus according to claim 1 including a nozzle, connected to the further transfer line, for distributing the hot fluid in the extractor.

13. A method of removing solvent from biomass in an extractor forming part of a biomass extraction circuit, the circuit including a working fluid comprising a solvent circulating therein whereby said fluid in a part of the circuit remote from the extractor is hotter than circulating solvent mingled with the biomass, the method including the step of transferring working fluid, whose energy content is sufficient to remove solvent from the biomass, from said part of the circuit via a further transfer line to the extractor separately from the circulating solvent to heat the said solvent mingled with the biomass and thereby separate said mingled solvent and biomass from one another.

14. A method according to claim 13 wherein the working fluid transferred via the transfer line is solvent vapour.

15. A method according to claim 13, including the step of controlling the flow of working fluid along the transfer line.

16. A method of extracting biomass in an extractor forming part of a closed loop extraction circuit comprising, connected in series, the extractor, an evaporator, a compressor and a condenser, the method including the steps of circulating a solvent around the circuit whereby the circulating solvent passes through the extractor and extracts the biomass;

operating the evaporator to separate solvent and biomass extract from one another;

compressing solvent in the compressor; and condensing solvent in the condenser, the method further including the step of transferring via a further transfer line hot solvent vapour from a part of the circuit, remote from the extractor, to the extractor separately from the circulating solvent to heat biomass and solvent therein and thereby separate biomass and solvent in the extractor from one another, and wherein the transfer of hot solvent vapor is from the compressor to the extractor via said transfer line.

17. A method according to claim 16 wherein the transfer line is selectively openable and closeable to control the transfer of hot solvent vapour to the extractor, the method including the step of controlling said transfer using the transfer line.

18. A method according to claim 17 including the steps of preventing transfer of hot vapour via the transfer line while the rate of condensation of solvent in the circuit exceeds a predetermined rate; and permitting transfer of hot vapour via the transfer line when the rate of condensation of solvent in the circuit falls below the predetermined rate thereby signifying substantial completion of biomass extraction.

* * * * *